United States Patent [19]
Kato et al.

[11] Patent Number: 5,735,121
[45] Date of Patent: Apr. 7, 1998

[54] AIR PUMP ABNORMALITY-DETECTING SYSTEM FOR INTERNAL COMBUSTION ENGINES

[75] Inventors: Hiroaki Kato; Yuichi Shimasaki; Takashi Komatsuda; Akihisa Saito; Tetsu Teshirogi, all of Wako, Japan

[73] Assignee: Honda Giken Kogyo Kabushiki Kaisha, Tokyo, Japan

[21] Appl. No.: 748,782

[22] Filed: Nov. 14, 1996

[30] Foreign Application Priority Data

Nov. 16, 1995 [JP] Japan .................. 7-321232

[51] Int. Cl.[6] ...................................... F01N 3/22
[52] U.S. Cl. ................................. 60/277; 60/289
[58] Field of Search ............................ 60/277, 289

[56] References Cited

U.S. PATENT DOCUMENTS 5,140,810  8/1992  Kuroda ...................... 60/277 X
5,615,552  4/1997  Shimasaki et al. ................ 60/277

*Primary Examiner*—Tony M. Argenbright
*Attorney, Agent, or Firm*—Nikaido, Marmelstein, Murray & Oram LLP

[57] ABSTRACT

An air pump abnormality-detecting system for an internal combustion engine. The engine has a catalyst arranged in the exhaust system of the engine, a passage extending from the exhaust system at a location upstream of the catalyst, and an electrically driven air pump arranged across the passage, for supplying secondary air into the exhaust system. A current sensor detects electric current flowing through the air pump, and a voltage sensor detects voltage applied to the air pump. An abnormality of the air pump is detected by comparing an output from the current sensor obtained during operation of the air pump, with predetermined abnormality-detecting reference values. At least one of the output from the current sensor or the predetermined abnormality-detecting reference values is corrected in response to an output from the voltage sensor.

6 Claims, 7 Drawing Sheets

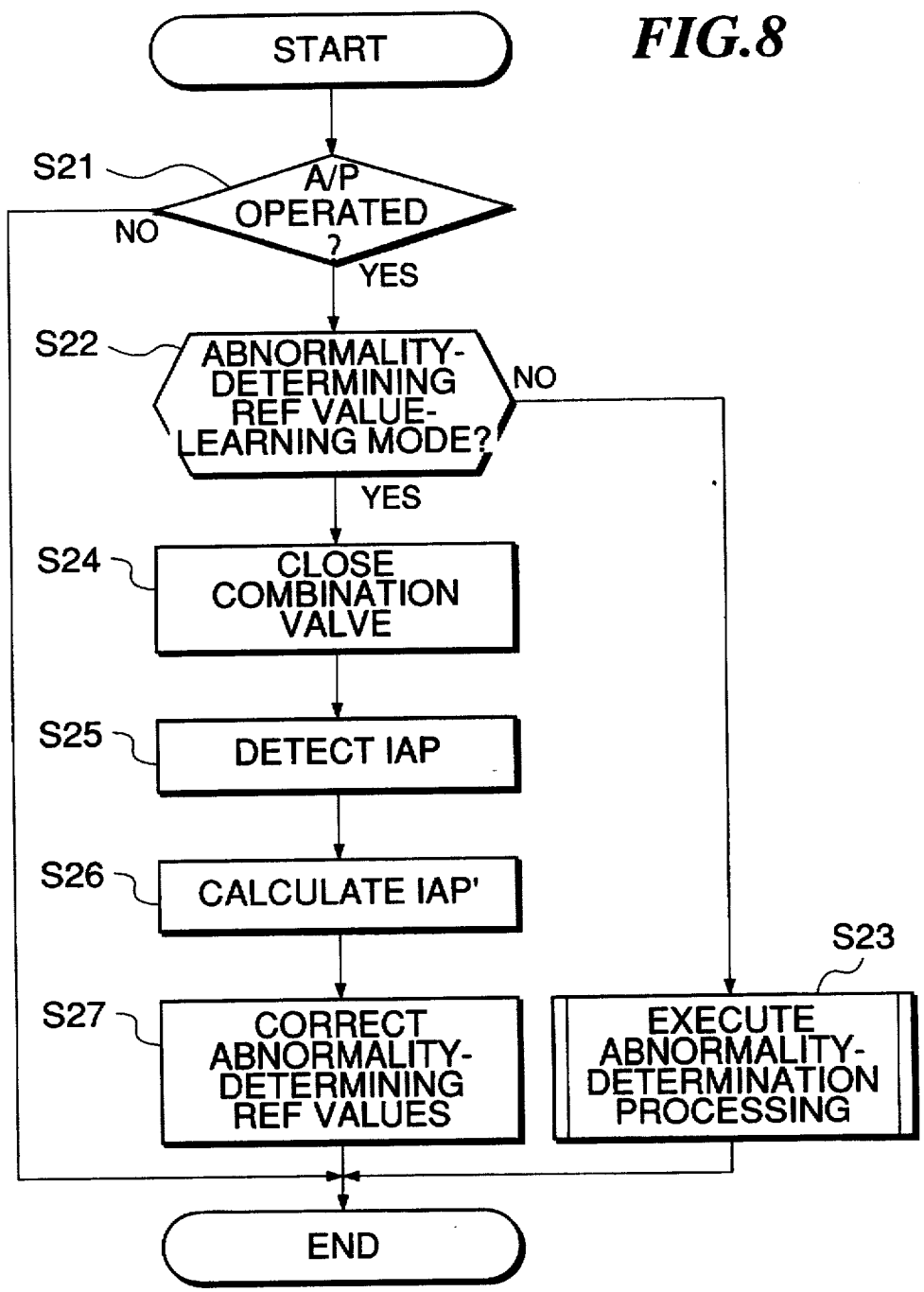

1

AIR PUMP ABNORMALITY-DETECTING SYSTEM FOR INTERNAL COMBUSTION ENGINES

BACKGROUND OF THE INVENTION

1. Field of the Invention

This invention relates to an air pump abnormality-detecting system for internal combustion engines, which detects an abnormality of an air pump which supplies secondary air into the exhaust passage of the engine to purify exhaust gases emitted from the engine, and more particularly to an air pump abnormality-detecting system of this kind, which calculates the flow rate of secondary air supplied by the air pump, based on electric current supplied to the air pump, to thereby carry out abnormality detection of the air pump.

2. Prior Art

Conventionally, a secondary air pump control system for internal combustion engines, is known, for example, from Japanese Laid-Open Patent Publication (Kokai) No. 8-61051 and U.S. Pat. No. 5,615,552 corresponding thereto, which controls an air pump which supplies secondary air into the exhaust passage to purify exhaust gases emitted from the engine, in such a manner that a secondary air amount supplied by the air pump is calculated based on voltage and current applied to the air pump, followed by a comparison between the thus calculated secondary air amount and a desired secondary air amount set based on an operating condition in which the engine is operating, to thereby control supply and termination of electric power to the air pump. Further, the known control system detects an abnormality of the air pump and informs the driver of the detected abnormality.

In the known secondary air pump control system, however, the current consumed by the air pump varies almost in proportion to an amount of change in output voltage from a battery of a vehicle in which the engine is installed (10 to 14.5 V) so long as the secondary air flow rate remains constant. Therefore, it is difficult to detect an abnormality of the air pump with high accuracy if the abnormality detection is carried out based on the current.

Further, in the known secondary air pump control system, when the abnormality detection is carried out at the start of operation of the air pump, a building-up transient characteristic of the current consumed by the air pump is not taken into consideration. Therefore, there is a fear that the air pump can be erroneously determined to be abnormal though it functions normally.

Furthermore, a reference current value or a reference voltage value for use in the abnormality detection of the air pump is determined without taking into account variations between individual air pumps to be determined for abnormality, which lowers the accuracy of the abnormality detection.

SUMMARY OF THE INVENTION

It is the object of the invention to provide an air pump abnormality-detecting system for internal combustion engines, which is capable of detecting an abnormality of the air pump with improved accuracy irrespective of a change in the output voltage of the battery and variations between individual air pumps to be determined for abnormality.

To attain the above object, the present invention provides an air pump abnormality-detecting system for an internal combustion engine having an exhaust system, catalyst means arranged in the exhaust system, a passage extending from the exhaust system at a location upstream of the catalyst means, and an electrically driven air pump arranged across the passage, for supplying secondary air into the exhaust system, the air pump abnormality-detecting system comprising:

current-detecting means for detecting electric current flowing through the air pump;

voltage-detecting means for detecting voltage applied to the air pump;

abnormality-detecting means for detecting an abnormality of the air pump by comparing an output from the current-detecting means obtained during operation of the air pump, with predetermined abnormality-detecting reference values; and abnormality-detecting parameter-correcting means responsive to an output from the voltage-detecting means, for correcting at least one of the output from the current-detecting means or the predetermined abnormality-detecting reference values.

Preferably, the abnormality-detecting parameter-correcting means corrects the output from the current-detecting means by correcting a value of electric current flowing through the air pump to be assumed when a secondary air flow rate of the air pump is zero during operation of the air pump, based on a value of the voltage detected by the voltage-detecting means and a predetermined reference voltage value.

Alternatively, the abnormality-detecting parameter-correcting means corrects the predetermined abnormality-detecting reference values, based on a value of the voltage detected by the voltage-detecting means and a predetermined reference voltage value.

Preferably, the abnormality-detecting means becomes operative after a predetermined time period has elapsed from the start of operation of the air pump.

Also preferably, the abnormality-detecting means further includes operating condition-determining means for determining whether the engine is in a state where the air pump is first operated after being installed in the engine or a state where the engine is inspected, and correcting means responsive to a result of the determination that the engine is in one of the states, for correcting at least one of the output from the current-detecting means or the predetermined abnormality-detecting reference values, based on a value of the electric current detected by the current-detecting means.

More preferably, the correcting means corrects at least one of the output from the current-detecting means or the predetermined abnormality-detecting reference values, based on a value of the electric current detected by the current-detecting means when a secondary air flow rate of the air pump is zero during operation of the air pump, and a predetermined reference current value.

The above and other objects, features, and advantages of the invention will be more apparent from the following detailed description taken in conjunction with the accompanying drawings.

BRIEF DESCRIPTION OF THE DRAWINGS

FIG. 8 is a flowchart showing a program for correcting an abnormality-detecting reference value.

DETAILED DESCRIPTION

The invention will now be described in detail with reference to the drawings showing embodiments thereof.

Figure 1:
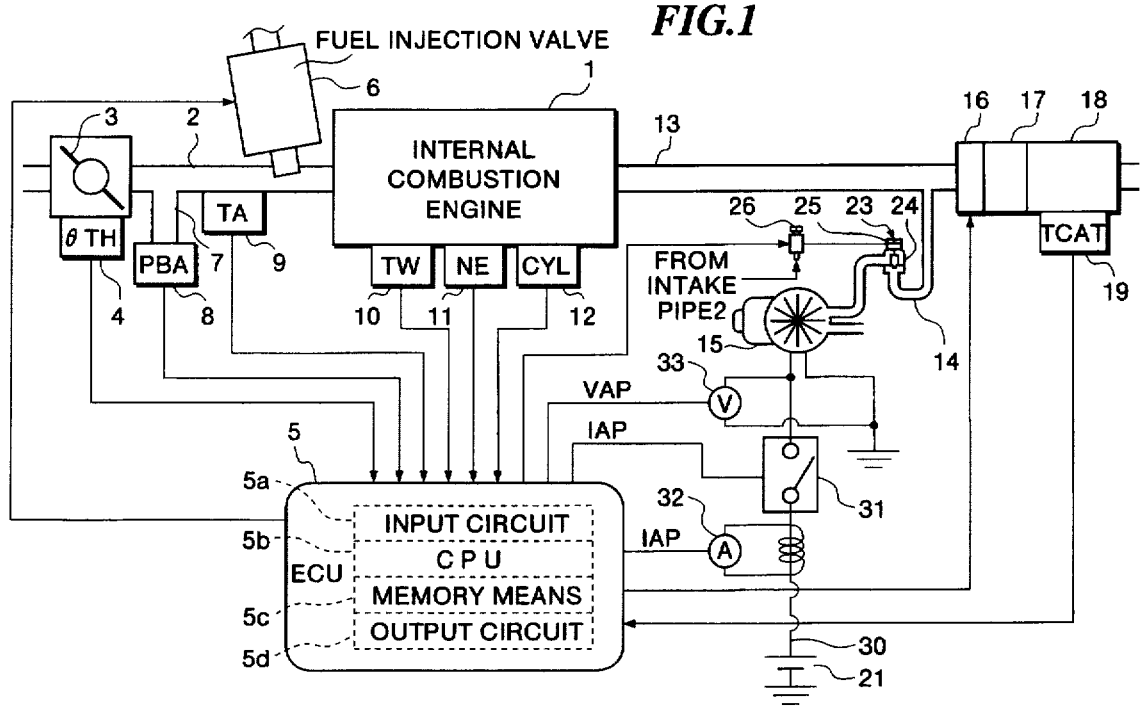
FIG. 1 is a block diagram schematically showing the whole arrangement of an internal combustion engine and an air pump abnormality-detecting system therefor, according to an embodiment of the invention.

Referring first to FIG. 1, there is illustrated the whole arrangement of an internal combustion engine and an air pump abnormality-detecting system therefor, according to an embodiment of the invention. In the figure, reference numeral 1 designates an internal combustion engine (hereinafter referred to as "the engine"), which has an intake pipe 2 connected to the cylinder block of the engine 1, in which is arranged a throttle valve 3. A throttle valve opening (θTH) sensor 4 is connected to the throttle valve 3, for supplying an electric signal indicative of the sensed throttle valve opening θTH to an electronic control unit (hereinafter referred to as ("the ECU") 5.

Fuel injection valves 6, only one of which is shown, are each provided for each cylinder and arranged in the intake pipe 2 at a location intermediate between the engine 1 and the throttle valve 3 and slightly upstream of an intake valve, not shown. The fuel injection valves 6 are connected to a fuel pump, not shown, and electrically connected to the ECU 5 to have their valve opening periods controlled by signals therefrom.

On the other hand, an intake pipe absolute pressure (PBA) sensor 8 is connected via a conduit 7 to the intake pipe 2 at a location immediately downstream of the throttle valve 3, for sensing absolute pressure PBA within the intake pipe 2, and is electrically connected to the ECU 5, for supplying an electric signal indicative of the sensed absolute pressure PBA to the ECU 5. Further, an intake air temperature (TA) sensor 9 is inserted into the intake pipe 2 at a location downstream of the PBA sensor 8, for supplying an electric signal indicative of the sensed intake air temperature TA to the ECU 5.

An engine coolant temperature (TW) sensor 10, which may be formed of a thermistor or the like, is mounted in the cylinder block of the engine 1, which is filled with coolant, for supplying an electric signal indicative of the sensed engine coolant temperature TW to the ECU 5.

An engine rotational speed (NE) sensor 11 and a cylinder-discriminating (CYL) sensor 12 are arranged in facing relation to a camshaft or a crankshaft of the engine 1, neither of which is shown. The NE sensor 11 generates a signal pulse (hereinafter referred to as "a TDC signal pulse") at each of predetermined crank angles (e.g. whenever the crankshaft rotates through 180 degrees when the engine is of a 4-cylinder type) which each correspond to a predetermined crank angle before a top dead point (TDC) of each cylinder corresponding to the start of the suction stroke of the cylinder, while the CYL sensor 12 generates a signal pulse at a predetermined crank angle of a particular cylinder of the engine, both of the pulses being supplied to the ECU 5.

An electrically-heated catalyzer (hereinafter referred to as "the EHC") 16, a starting catalyzer 17, and a three-way catalyzer 18 are arranged in an exhaust pipe 13 connected to the engine 1 in this order from an upstream side thereof, for purifying noxious components in exhaust gases from the engine, such HC, CO, and NOx. The starting catalyzer 17 is a small-sized catalyzer provided mainly for purifying exhaust gases emitted from the engine immediately after starting thereof.

Extending from the exhaust pipe 13 is a passage 14 for supplying secondary air into the exhaust pipe 13 at a location upstream of the EHC 16, across which is arranged an electrically-driven air pump 15. A combination valve 23 is arranged in the passage 14 at a location upstream of the air pump 15, which is comprised of a one-way reed valve 24 for allowing air to flow from the air pump 15 to the exhaust pipe 13 and for inhibiting air from flowing from the exhaust pipe 13 to the air pump 15, and a diaphragm valve 25 coupled to the reed valve 24. The diaphragm valve 25 has a pilot portion thereof electrically connected to the intake pipe 2 via an electromagnetic valve 26. The electromagnetic valve 26 is electrically connected to the ECU 5 to have its valving operation controlled by a signal from the ECU 5.

The air pump 15 is electrically connected to a battery 21 as a power source via a connecting line 30 across which is arranged a switch 31 for starting and stopping the operation of the air pump 15. The switch 31 is electrically connected to the ECU 5 to have its switching operation controlled by a signal from the ECU 5. Thus, the air pump 15 is operative when the switch 31 is on, during which the supply of secondary air to the exhaust pipe 13 is on/off-controlled through the valving operation of the combination valve 23.

Further, an electric current sensor 32 as current-detecting means is provided on the connecting line 30, for detecting pump current IAP flowing through the connecting line 30. The electric current sensor 32 is electrically connected to the ECU 5, for supplying a signal indicative of the sensed pump current IAP to the ECU 5. The electric current sensor 32 also functions to detect an abnormality such as a disconnection in the wiring. Further, a voltage sensor 33 as voltage-detecting means is provided on the connecting line 30, for detecting pump voltage VAP supplied to the air pump 15. The voltage sensor 33 is electrically connected to the ECU 5, for supplying a signal indicative of the sensed voltage VAP to the ECU 5.

The EHC 16 is electrically connected to the ECU 5 to have its operation controlled by a signal from the ECU 5. Further, a catalyst temperature sensor 19 is connected to the three-way catalyzer 18, for supplying an electric signal indicative of the sensed catalyst temperature TCAT to the ECU 5.

The ECU 5 is comprised of an input circuit 5a having the functions of shaping the waveforms of input signals from various sensors, shifting tile voltage levels of sensor output signals to a predetermined level, converting analog signals from analog-output sensors to digital signals, and so fourth, a central processing unit (hereinafter referred to as "the CPU") 5b, memory means 5c storing various operational programs which are executed by the CPU 5b and for storing results of calculations therefrom, etc., and an output circuit 5d which delivers control signals to the fuel injection valves 6, air pump 15, EHC 16, etc., for driving the same.

Next, description will made of the operation of the air pump 15.

When an ignition switch, not shown, of the engine 1 is turned on, the ECU 5 determines whether or not conditions for operating the air pump are satisfied, based on outputs from engine operating parameter sensors (e.g. engine coolant temperature TW, intake air temperature TA, and catalyst temperature TCAT). If the conditions are satisfied, the switch 31 is turned on to supply electric power from the battery 21 to the air pump 15, to thereby drive the air pump 15 over a predetermined time period. At the same time, the ECU 5 delivers a pump-on command signal to the electromagnetic valve 26 to open the same, to thereby supply intake negative pressure from the intake pipe 2 into the pilot portion of the diaphragm valve 25. This causes the diaphragm valve 25 to operate in response to the intake negative pressure to open the reed valve 24, to thereby supply secondary air from the air pump 15 into the exhaust pipe 13. Thus, noxious components, such as carbon monoxide (CO), present in exhaust gases from the engine are oxidized, and the catalyst is promptly activated to improve the exhaust gas purification efficiency.

The pump current (current consumed by the air pump) IAP and pump voltage VAP supplied from the power source to the air pump 15 are detected by the current sensor 32 and the voltage sensor 33, respectively, and signals indicative of the sensed values are delivered to the ECU 5. Further, output voltage VB from the battery 21 is detected by a voltage sensor, not shown, and a signal indicative of the sensed voltage VB is delivered to the ECU 5.

Figure 2:
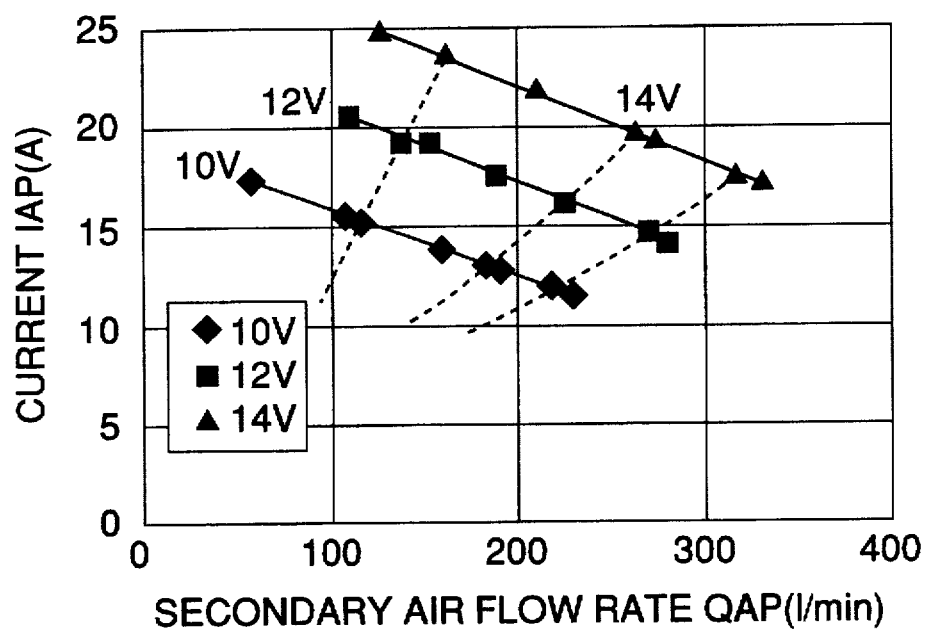
FIG. 2 is a graph showing the relationship between electric current flowing through an air pump appearing in FIG. 1 and a secondary air amount supplied by the same.

In the present embodiment, the pump current IAP is corrected by the battery voltage VB in a manner described hereinbelow:

FIG. 2 shows the relationship between the pump current IAP flowing through the air pump 15 and the secondary air flow rate Q. The air pump 15 has a characteristic that a flow rate QAP of secondary air by the air pump (secondary air flow rate QAP) and the pump current IAP increase as the pump voltage VAP applied to the air pump 15 increases, as indicated by the broken lines in FIG. 2. In other words, provided that the pump voltage VAP is constant, the pump current IAP decreases as the secondary air flow rate QAP increases, as indicated by the solid lines in FIG. 2. The characteristic curves indicated by the solid lines each assume an almost straight line extending with a similar constant gradient to the others.

Thus, the relationship between the pump current IAP and the secondary air flow rate QAP can be generally expressed by the following equation (1), provided that the pump voltage VAP is constant:

$$IAP = -a \times QAP + b \quad (1)$$

where a and b represent constants which are set for each air pump employed.

Since the gradient a of the IAP-QAP characteristic curve is almost constant even if the pump voltage VAP is changed, if the b value, which is a value of the pump current IAP assumed when the flow rate QAP is zero, is corrected to a value b' which is obtained when the pump voltage VAP is a reference voltage, e.g. 12 V, the IAP-QAP characteristic curve can be approximated by a linear expression. The pump voltage VAP can be replaced by the battery voltage VB.

Therefore, if the reference pump voltage is set to 12 V, the b' value depends upon the battery voltage VB as expressed by the following equation (2):

$$b' = 12 \times b / VB \quad (2)$$

Accordingly, from the above two equations (1) and (2), a corrected pump current value IAP' can be approximated by the following equation (3):

$$IAP' = a \times QAP + 12 \times b / VB \quad (3)$$

The secondary air flow rate QAP of the air pump 15 can be calculated from the pump voltage VAP and the pump current IAP by a conventional method.

Figure 3:
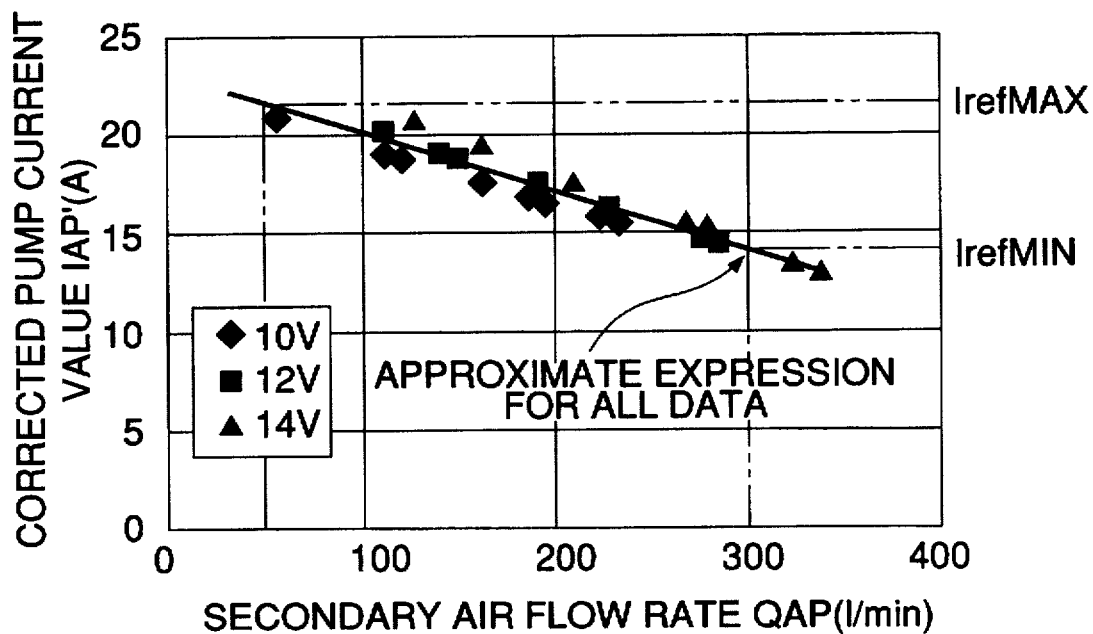
FIG. 3 is a graph showing the relationship between a corrected value of the electric current flowing through the air pump and the secondary air amount supplied by the same.

FIG. 3 shows the relationship between the corrected pump current value IAP' and the secondary air flow rate QAP of the air pump 15.

According to the present embodiment, the above calculations are executed by the ECU 5, and the IAP' value can be expressed by the single linear equation (3).

On the other hand, the allowable secondary air flow rate of the air pump 15 falls within a range from 50 liters/min (lower limit value) to 300 liters/min (upper limit value). Accordingly, as is apparent from FIG. 3, if the corrected pump current value IAP' falls within a range from 14 A (predetermined lower limit value IrefMIN) to 22 A (predetermined upper limit value IrefMAX), it is determined that the air pump 15 is functioning normally. On the other hand, if the corrected pump current value IAP' is lower than 14 A (irefMIN), or higher than 22 A (IrefMAX), which means that the secondary air flow rate of the air pump 15 is larger than 300 liters/min or lower than 50 liters/min, it is determined that the air pump 15 is functioning abnormally. More specifically, if the secondary air flow rate is lower than 50 liters/min, there is a possibility that the air pump 15 per se is defective or a piping system thereof is clogged. On the other hand, if the secondary air flow rate exceeds 300 liters/min, there is a possibility that the piping system is damaged so that secondary air leaks therefrom, resulting in an excessive flow rate of secondary air from the air pump 15.

Figure 4:
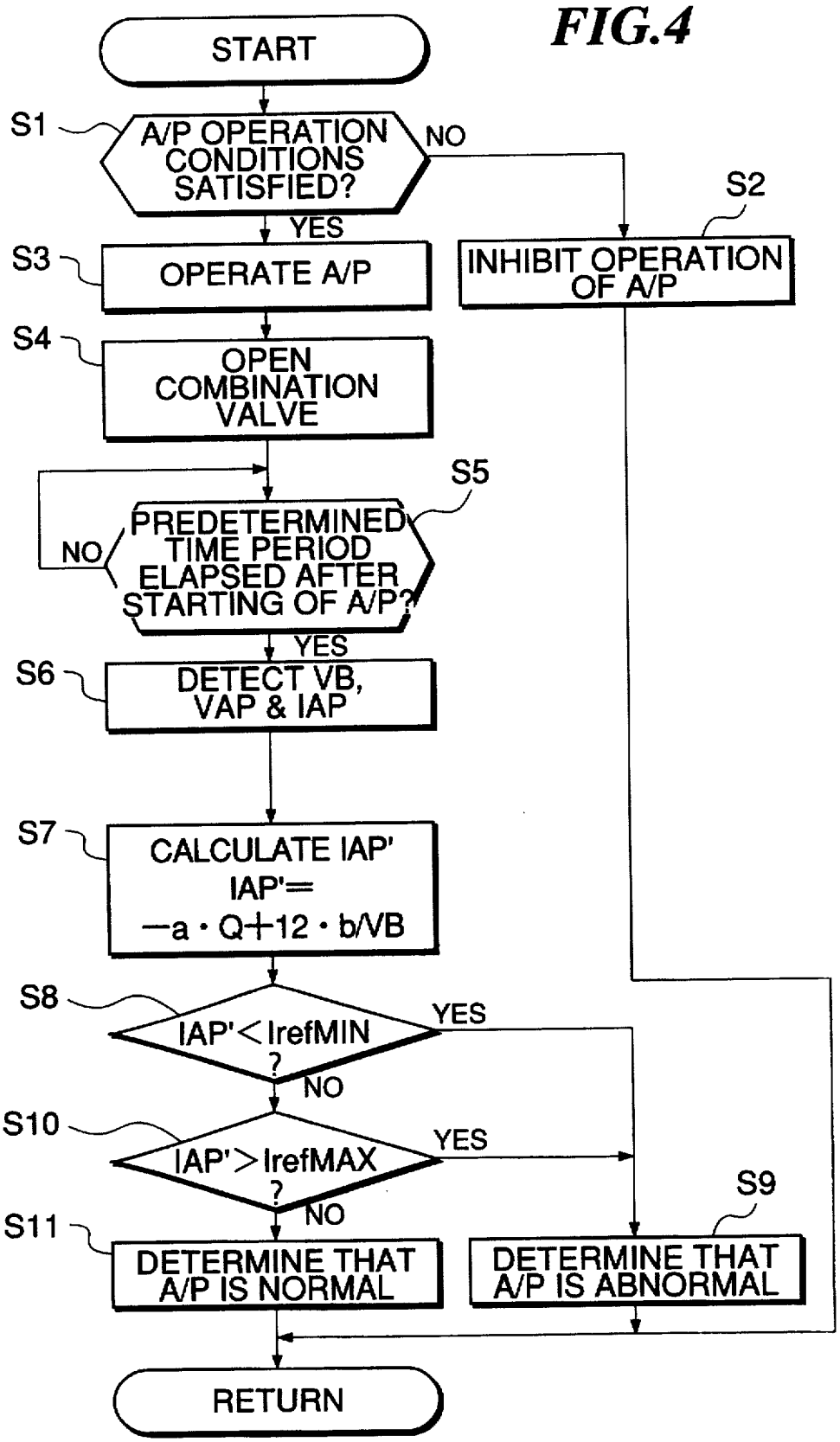
FIG. 4 is a flowchart showing a program for carrying out abnormality detection of the air pump, according to the embodiment.

Next, description will be made of a manner of carrying out abnormality detection of the air pump 15 according to the present embodiment, with reference to FIG. 4 showing a program for carrying out the abnormality detection of the air pump 15, which is executed at predetermined time intervals.

First, at a step S1, it is determined whether or not the conditions for operating the air pump (A/P) are satisfied. The air pump-operating conditions include conditions that the ignition switch is on, and the engine coolant temperature TW, the intake air temperature TA, and the catalyst temperature TCAT fall within respective predetermined ranges.

If the air pump-operating conditions are not satisfied at the step S1, the air pump 15 is not inhibited from being operated at a step S2, followed by terminating the present routine. On the other hand, if the air pump-operating conditions are satisfied, the air pump 15 is operated at a step S3, and then the combination valve 23 is opened at a step S4. Then, it is determined at a step S5 whether or not a predetermined time period (e.g. 1 sec) has elapsed after the start of operation of the air pump 15. If the predetermined time period has not elapsed, the step S5 is repeatedly executed until the predetermined time period elapses, followed by the program proceeding to a step S6. The reason why the step S5 is repeatedly executed until the predetermined time period elapses will be described hereinafter.

At the step S6, the battery voltage VB, the pump voltage VAP of the air pump 15, and the pump current IAP of the same are detected. Then, the corrected pump current value IAP' is calculated by the use of the aforementioned equation (3).

Next, it is determined at a step S8 whether or not the corrected pump current value IAP' is smaller than the predetermined lower limit value IrefMiN. If IAP'<IrefMIN holds, which means that the secondary air flow rate QAP of the air pump 15 is larger than the upper limit value of the allowable secondary air flow rate, i.e. there is a possibility that the piping system is damaged so that secondary air leaks, resulting in an excessive flow rate of secondary air by the air pump 15. Therefore, it is determined at a step S9 that the air pump 15 is functioning abnormally. On the other hand, if IAP'≧IrefMiN holds, then it is determined at a step S10 whether or not the corrected pump current value IAP' is larger than the predetermined upper limit value IrefMAX. If IAP'>irefMAX holds, which means that the secondary air flow rate QAP of the air pump 15 is smaller than the lower limit value of the allowable secondary air flow rate, i.e. there is a possibility that the air pump 15 per se is defective or the piping system is clogged. Therefore, the program proceeds to a step S9, wherein it is determined that the air pump 15 is functioning abnormally. If IAP'≦IrefMAX holds, which means that the corrected pump current value IAP' falls within an allowable range, and then it is determined at a step S11 that the air pump 15 is functioning normally.

According to the present embodiment, the corrected pump current value IAP' which depends upon the battery voltage VB directly corresponds to the secondary air flow rate of the air pump 15, irrespective of a change in the battery voltage VB, enabling monitoring of the secondary air flow rate with high accuracy.

Figure 5:
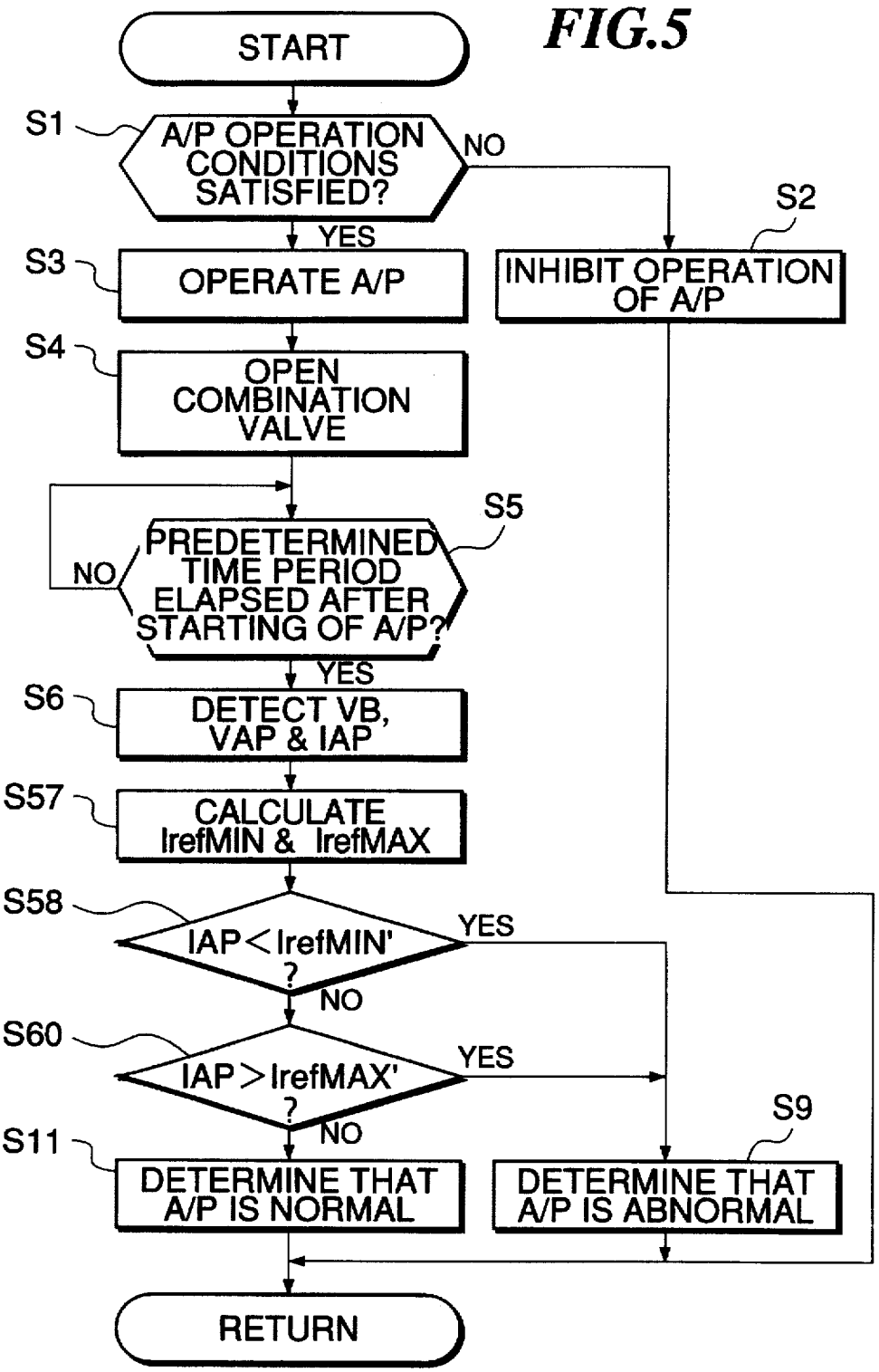
FIG. 5 is a flowchart showing a program for carrying out abnormality detection of the air pump, according to another embodiment of the invention.

Next, description will be made of another embodiment of the invention, with reference to FIG. 5 showing a program for carrying out abnormality detection of the air pump according to the another embodiment, which is executed at predetermined time intervals.

In FIG. 5, the same steps as those in FIG. 4 are designated by the same reference numerals and description thereof is omitted, while description of only steps different from those in FIG. 4 will be made hereinbelow.

Figure 6:
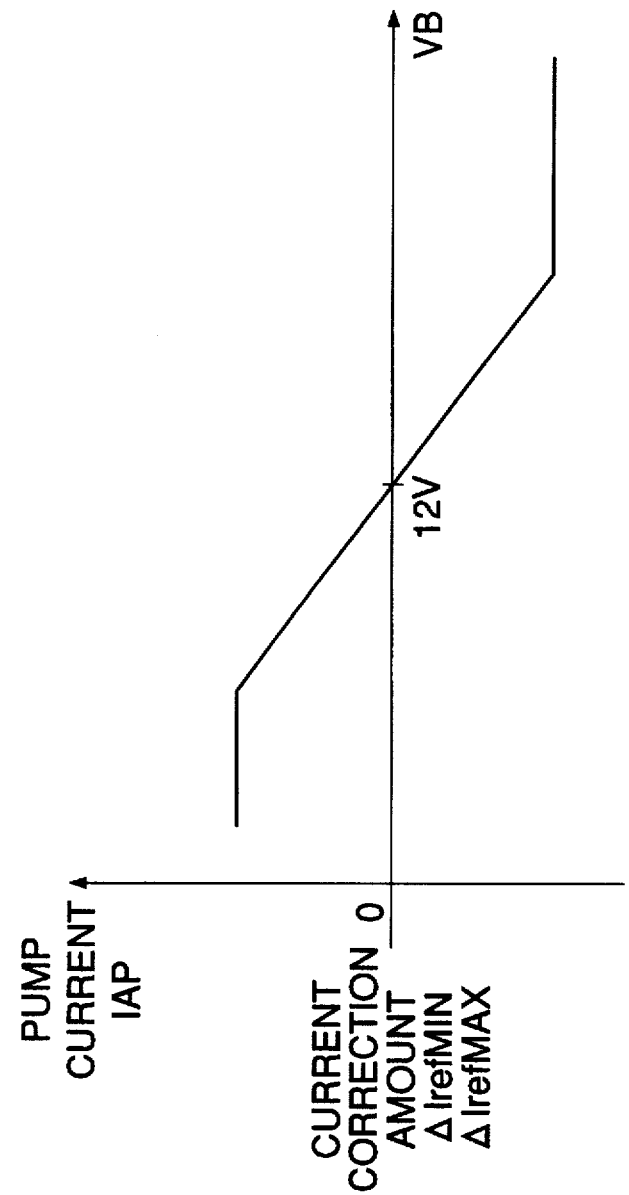
FIG. 6 is a graph showing a manner of determining correction amounts for upper and lower current values of pump current with respect to battery voltage VB.

After executing the step S6 in FIG. 5, i.e. after the battery voltage VB, the pump voltage VAP of the air pump 15, and the pump current IAP of the same are detected, a corrected value IrefMiN' of the lower limit value IrefMIN and a corrected value IrefMAX' of the upper limit value IrefMAX are calculated at a step S57. More specifically, a correction amount ΔIrefMiN of the lower limit value IrefMIN and a correction amount ΔIrefMAX of the upper limit value IrefMAX are determined in a manner shown in FIG. 6, based on the battery voltage VB (reference battery voltage: 12 V), and the thus calculated correction amounts ΔIrefMiN and ΔIrefMAX are added to the predetermined lower and upper limit values IrefMiN and IrefMAX, respectively, to thereby obtain the corrected values IrefMiN' and IrefMAX'. The pump voltage VAP can be replaced by the battery voltage VB as mentioned above.

Then, it is determined at a step S58 whether or not the pump current IAP of the air pump 15 is smaller than the corrected value IrefMIN' of the lower limit value the corrected value irefMiN' of the lower limit value IrefMiN. If the IAP<IrefMiN' holds, the program proceeds to the step S9, wherein it is determined that the air pump 15 is functioning abnormally, for the same reason as stated with respect to FIG. 4. On the other hand, if IAP≧IrefMiN' holds, the program proceeds to a step S60, wherein it is determined whether or not the pump current value IAP is larger than the corrected value IrefMAX' of the upper limit value IrefMAX. If IAP>IrefMAX' holds, the program proceeds to the step S9, wherein it is determined that the air pump 15 is functioning abnormally, for the same reason as stated with respect to FIG. 4. On the other hand, if IAP≦IrefMAX' holds, which means that the pump current value IAP falls within an allowable range, and therefore it is determined at the step S11 that the air pump 15 is functioning normally.

According to the present embodiment, the corrected Value IrefMAX' of the upper limit value irefMAX and the corrected value IrefMiN' of the lower limit value IrefMIN, which depend upon the battery voltage VB, directly correspond to the upper and lower limits of the allowable secondary air flow rate of the air pump 15, irrespective of an change in the battery voltage VB, enabling monitoring of the secondary air flow rate with high accuracy.

Figure 7:
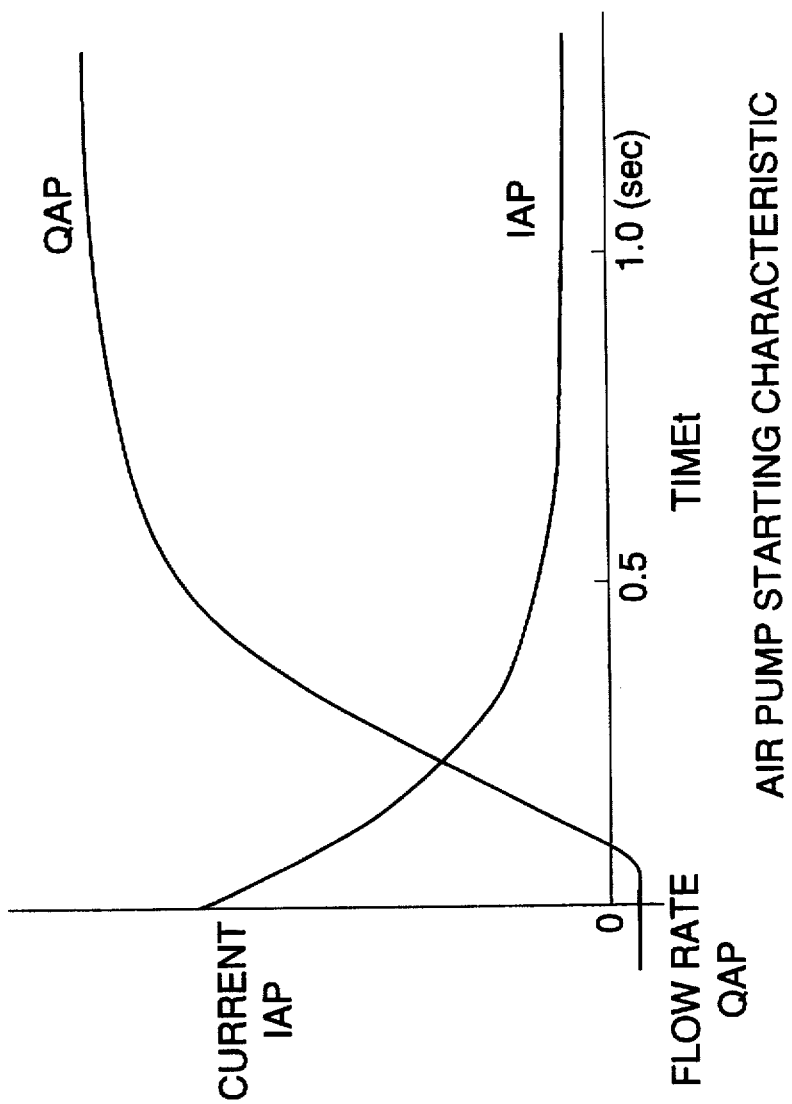
FIG. 7 is a graph showing building-up characteristics of the air pump.

FIG. 7 shows building-up characteristics of the air pump 15. As is clear from the figure, it takes about 1sec for the secondary air flow rate of the air pump 15 to become saturated to stabilize the pump current IAP after the start of the air pump 15. Therefore, if the abnormality detection of the air pump 15 is carried out immediately after the start of the air pump 15 without the building-up transient characteristics of the air pump 15 taken into account, there is a possibility that the air pump 15 is erroneously determined to be functioning abnormally though it is functioning normally.

According to the above described embodiments, therefore, at the start of operation of the air pump 15, the abnormality detection is inhibited until a predetermined time period elapses after turning-on of the switch 31 of the air pump 15 (see the step S5 in FIGS. 4 and 5). The predetermined time period is set to a time period within which the secondary air flow rate of the air pump 15 becomes saturated after the start of the air pump 15, e.g. 1 to 2 seconds in the example of FIG. 7.

According to the embodiments, the air pump abnormality determination is inhibited immediately after the start of operation of the air pump 15, when the secondary air flow rate is not yet stabilized, and therefore an erroneous detection can be prevented that the secondary air flow rate of the air pump 15 is insufficient in spite of the air pump 15 functioning normally, to thereby enable carrying out the abnormality detection of the air pump 15 with high accuracy.

Next, description will made of a manner of correcting the abnormality-detecting reference values of the air pump 15.

In the above equation (1) of IAP=−a×QAP+b for calculating the corrected pump current value IAP' of the air pump 15, if the b value varies between individual air pumps 15 employed, predetermined abnormality determination values set beforehand cannot be applied to all the air pumps 15 employed. Therefore, a reference value IREF of the b value which is set beforehand for a reference air pump is corrected when the air pump 15 installed in a new vehicle is first operated or when the engine 1 is inspected. More specifically, first, the air pump 15 is operated with the combination valve 23 closed to thereby detect the pump current IAP assumed when the secondary air flow rate is 0, by the pump current sensor 32. Then, a difference between the thus detected pump current IAP and the reference value IREF set beforehand for the b value is obtained, and the reference value IREF for the b value is corrected by the thus obtained difference. This correction is carried out according to a program shown in FIG. 8 for correcting the abnormality-detecting reference values, which is executed at predetermined time intervals.

First, at a step S21, it is determined whether or not the air pump 15 is operative, and if the air pump 15 is not operative, the present routine is immediately terminated. On the other hand, if it is determined that the air pump 15 is operative, the program proceeds to a step S22, wherein it is determined whether or not the present loop is in a learning mode for correcting the abnormality-detecting reference values of the air pump 15, which mode is established when the engine is first started after being installed into a newly manufactured vehicle or when it is started for inspection thereof. If it is determined that the present loop is in a mode other than the learning mode, i.e. the present loop is in a normal engine starting mode, then the abnormality detecting processing for the normal engine starting mode is executed at a step S23, according to the program of FIG. 4, described above.

On the other hand, if it is determined at the step S22 that the present loop is in the learning mode for the abnormality-detecting reference value correction, then correction processing for the abnormality-detecting reference values of the air pump 15 is executed at a step S24 et seq.

First, at the step S24, the combination valve 23 is closed. Thus, the air pump 15 is operated with the secondary air flow rate equal to 0. Next, the pump current IAP consumed by the air pump 15 is detected by the current sensor 32 at a step S25.

At the step S26, a calculation is made of a difference between the reference pump current IREF which was set beforehand for the reference air pump of the type which the air pump 15 belongs to, and the actual pump current IAP detected at the step S25, and the thus calculated difference is set as a current correction value DIREF (IREF-IAP). Then, at a step 27, the current correction value DIREF is added to each of the predetermined upper limit value IrefMAX of the pump current IAP and the predetermined lower limit value IrefMIN of the same, to thereby obtain corrected values of the abnormality-detecting reference values for the air pump 15, by the use of the following equations (4) and (5):

$$IrefMAX = IrefMAX + DIREF \quad (4)$$

$$IrefMiN = IrefMIN + DIREF \quad (5)$$

By thus learning the abnormality-detecting reference values for the air pump 15, the reference values can be set for each of the individual air pumps 15, and therefore the influence of variations between individual air pumps 15 can be eliminated, which makes it possible to monitor the secondary air flow rate with high accuracy.

Further, alternatively to the above correction of the abnormality-detecting reference values at the step S27, the pump current IAP may be corrected such that the current correction value DIREF is added to the detected pump current IAP, by the use of the following equation (6), and then the obtained corrected pump current IAP is compared with the upper limit value IrefMAX and the lower limit value IrefMIN, to thereby determine an abnormality of the air pump 15, based on results of the comparison:

$$IAP = IAP + DIREF \quad (6)$$

According to this variation, the pump current IAP of each air pump 15 is learned, and tire learned pump current IAP is compared with the abnormality-detecting reference values, to thereby determine abnormality of the air pump, based on results of the comparison. As a result, the influence of variations between individual air pumps can be eliminated, which makes it possible to monitor the secondary air flow rate with high accuracy.

What is claimed is:

1. An air pump abnormality-detecting system for an internal combustion engine having an exhaust system, catalyst means arranged in the exhaust system, a passage extending from said exhaust system at a location upstream of said catalyst means, and an electrically driven air pump arranged across said passage, for supplying secondary air into said exhaust system, said air pump abnormality-detecting system comprising:

current-detecting means for detecting electric current flowing through said air pump;

voltage-detecting means for detecting voltage applied to said air pump;

abnormality-detecting means for detecting an abnormality of said air pump by comparing an output from said current-detecting means obtained during operation of said air pump, with predetermined abnormality-detecting reference values; and abnormality-detecting parameter-correcting means responsive to an output from said voltage-detecting means, for correcting at least one of said output from said current-detecting means or said predetermined abnormality-detecting reference values.

2. An air pump abnormality-detecting system as claimed in claim 1, wherein said abnormality-detecting parameter-correcting means corrects said output from said current-detecting means by correcting a value of electric current flowing through said air pump to be assumed when a secondary air flow rate of said air pump is zero during operation of said air pump, based on a value of said voltage detected by said voltage-detecting means and a predetermined reference voltage value.

3. An air pump abnormality-detecting system as claimed in claim 1, wherein said abnormality-detecting parameter-correcting means corrects said predetermined abnormality-detecting reference values, based on a value of said voltage detected by said voltage-detecting means and a predetermined reference voltage value.

4. An air pump abnormality-detecting system as claimed in claim 1, wherein said abnormality-detecting means becomes operative after a predetermined time period has elapsed from the start of operation of said air pump.

5. An air pump abnormality-detecting system as claimed in any of claims 1 to 4, wherein said abnormality-detecting means further includes operating condition-determining means for determining whether said engine is in a state where said air pump is first operated after being installed in said engine or a state where said engine is inspected, and correcting means responsive to a result of said determination that said engine is in one of said states, for correcting at least one of said output from said current-detecting means or said predetermined abnormality-detecting reference values, based on a value of said electric current detected by said current-detecting means.

6. An air pump abnormality-detecting system as claimed in claim 5, wherein said correcting means corrects at least one of said output from said current-detecting means or said predetermined abnormality-detecting reference values, based on a value of said electric current detected by said current-detecting means when a secondary air flow rate of said air pump is zero during operation of said air pump, and a predetermined reference current value.

\* \* \* \* \*